W. SHORT.
MACHINE FOR DRESSING CHICKENS.
APPLICATION FILED JUNE 19, 1915.
1,171,669.
Patented Feb. 15, 1916.
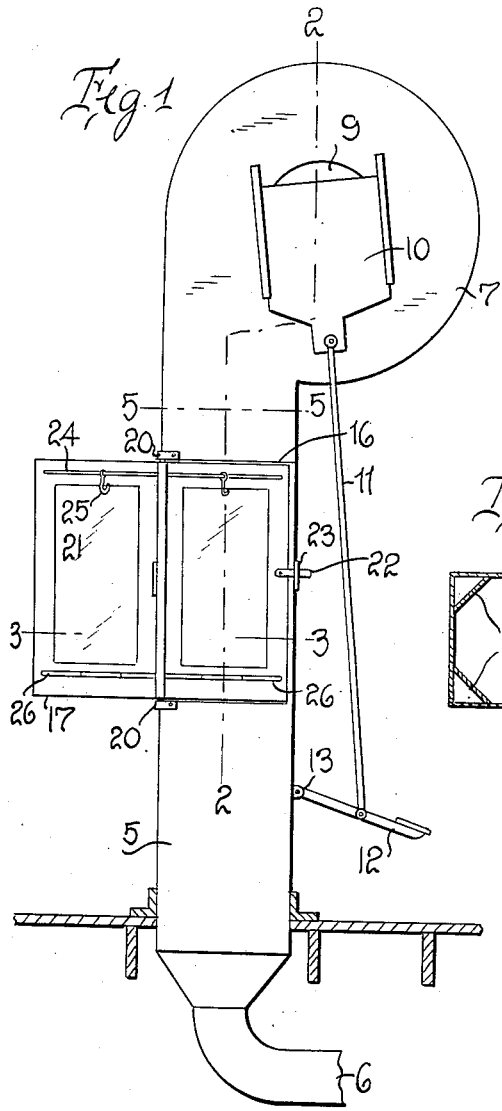
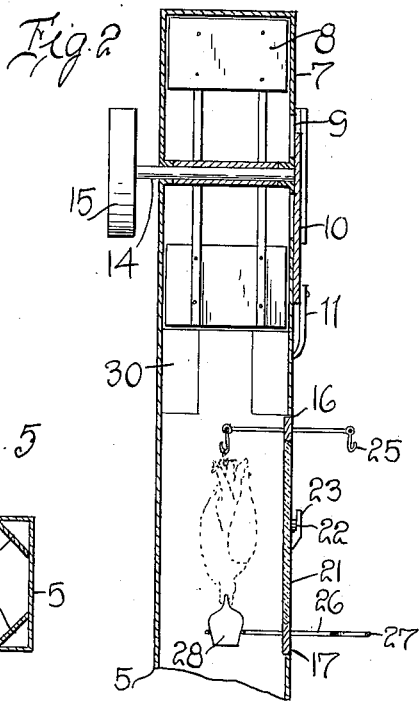
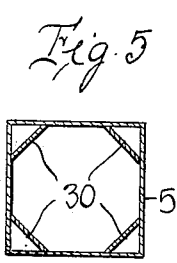
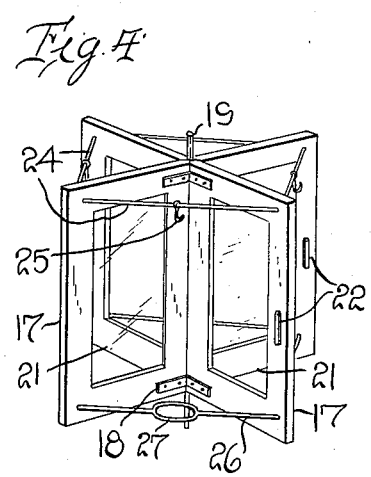
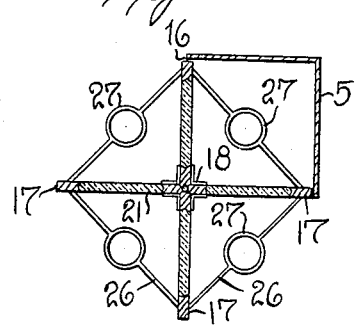
Inventor
W. SHORT
By Watson E. Coleman
Attorney

UNITED STATES PATENT OFFICE.

WILLIAM SHORT, OF DENISON, IOWA.

MACHINE FOR DRESSING CHICKENS.

1,171,669.  Specification of Letters Patent.  Patented Feb. 15, 1916.

Application filed June 19, 1915. Serial No. 35,089.

*To all whom it may concern:*

Be it known that I, WILLIAM SHORT, a citizen of the United States, residing at Denison, in the county of Crawford and State of Iowa, have invented certain new and useful Improvements in Machines for Dressing Chickens, of which the following is a specification, reference being had to the accompanying drawings.

This invention relates to an improved machine for dressing chickens and has for its primary object to provide means for facilitating the operation of killing and defeathering fowls.

It is one of the more particular objects of the invention to provide an apparatus for the above purpose including an air pipe or conduit and a fan for driving a strong current of air through the same, and rotatable means mounted in the conduit in which a plurality of fowls are hung to be successively disposed in the conduit within the line of the air current.

It is another object of the invention to provide a rotatable fowl carrier mounted in the air conduit, which is provided with radially extending wings or sections adapted to close two sides of the conduit, said wings being provided with transparent panes to afford a clear view of the interior of the conduit, and improved means for suspending a fowl between adjacent wings of the carrier.

It is a further object of my invention to provide a device of the above character which is simple in its construction, highly convenient and serviceable in practical use and greatly expedites the dressing or preparation of the fowl.

With the above and other objects in view, my invention consists in the novel features of construction, combination and arrangement of parts to be hereinafter more fully described, claimed and illustrated in the accompanying drawing, in which, Figure 1 is a side elevation illustrating the preferred embodiment of the invention; Fig. 2 is a section taken on the line 2—2 of Fig. 1; Fig. 3 is a section taken on the line 3—3 of Fig. 1; Fig. 4 is a perspective view of the rotatable fowl carrier; Fig. 5 is a detail horizontal section taken on the line 5—5 of Fig. 1.

Referring in detail to the drawing, 5 designates the vertically disposed pipe or conduit, preferably of rectangular form in cross-section. The lower end of this conduit is suitably mounted in the floor or other stationary support and to the same, one end of a pipe 6 is connected, through which the feathers are adapted to be discharged to any desired point. The upper end of the vertical conduit 5 is provided with a substantially circular casing or housing 7 within which a suitable fan 8 is mounted. One side of the casing is provided with an opening 9 for the inlet of air which is adapted to be closed by a slidably mounted valve plate 10, to one end of which the rod 11 is pivotally connected. The lower end of this rod is attached to the lever 12 which is fulcrumed upon the wall of the conduit 5, as at 13. On one end of the fan shaft 14 extending exteriorly of the casing, a suitable belt wheel 15 is secured, upon which the driving belt extending from an engine or other suitable power source, is engaged.

At a point intermediate of its ends, two of the walls of the conduit 5, extending at right angles to each other, are cut away as at 16, and in the opening thus provided, the fowl carrier is mounted. This carrier consists of a plurality of diametrically opposed radially extending wings 17 which are rigidly connected at their inner longitudinal edges by means of the angle brackets 18 to a vertical rod or pintle 19. The extremities of this pintle projecting slightly beyond the ends of the fowl carrier, are engaged in bearing sockets 20 provided at the upper and lower ends of the opening in the conduit 5 at the juncture of the angularly disposed walls thereof. Each of the wings or panels 17 of the rotatable carrier is provided with a pane of glass or other transparent material indicated at 21, and the outer vertical edge of the wing has a pivoted latch member 22 arranged thereon for engagement with the keeper 23 which is secured to one wall of the conduit 5 at the side of the opening 16 therein. The adjacent wings 17 of the fowl carrier are connected contiguous to their upper ends by means of the horizontal rods 24 and each of these rods is centrally provided with a depending hook 25. Similar rods 26 also connect the adjacent wings 17 at their lower ends and in each of these latter rods, a ring 27 is centrally formed to receive the blood cup, indicated at 28.

In the operation and use of my invention, the fowls are suspended by their feet from the hooks 25 and the bill of the fowl is opened to receive the blood cup 28 which is seated in the ring 27 of the lower brace rod 26. The throat or neck of the fowl is then cut, and the rotatable carrier turned to dispose the fowl within the conduit 5. The dripping blood is caught in the cup 28. The fan 8 is then started in operation so that a strong blast of air is driven downwardly through the conduit. This air blast removes the feathers from the body of the fowl and directs the same into the discharge pipe 6. For the purpose of causing a swirling current of air to strike the fowl, deflecting plates, indicated at 30, are mounted in the corners of the rectangular conduit 5 above the rotatable fowl carrier so that this portion of the conduit is of hexagonal interior cross-sectional form. The condition of the fowl can be observed through the transparent panes 21 in the wings of the rotatable carrier, and after one fowl has been dressed, the carrier is rotated so as to dispose another of the fowls which has been mounted therein within the conduit, while the prepared fowl is removed. In this way, it will be seen that no time is lost as, while one of the fowls is being defeathered, the other fowls may be mounted in the carrier. Thus a large number of fowls can be very easily and quickly dressed and the blood completely drained from the body. The invention is, therefore, well adapted to use in hotels and large boarding houses as it provides means whereby the preparation of fowls may be greatly expedited.

From the foregoing description, taken in connection with the accompanying drawing, the construction, manner of operation and several advantages of my invention may be clearly and fully understood.

The apparatus is simple in its construction and the several parts thereof may be very readily cleaned so that the device can, at all times, be maintained in a highly sanitary condition. While a fowl is being treated, the rotatable carrier is securely held against movement by means of the latch member 22 and the conduit is completely closed so that the full force of the air current will strike the body of the fowl and quickly and thoroughly remove the feathers therefrom.

While I have shown and described the preferred construction and arrangement of the several elements employed, it will be understood that the device is susceptible of considerable modification therein and I, therefore, reserve the privilege of resorting to all such legitimate changes as may be fairly embodied within the spirit and scope of the invention as claimed.

Having thus fully described my invention, what I desire to claim and secure by Letters Patent is:—

1. In an apparatus of the character described, an air conduit, and a movable fowl carrier mounted upon the conduit and adapted to be operated to dispose a fowl carried thereby within the conduit and subject the same to a blast of air passing therethrough whereby the feathers are removed from the body of the fowl.

2. In an apparatus of the character described, a conduit having an opening therein intermediate of its ends, and a fowl carrier rotatably mounted in said opening and adapted to be positioned to dispose a fowl carried thereby within the conduit and subject the same to a blast of air passing therethrough whereby the feathers are removed from the body of the fowl.

3. In an apparatus of the character described, an air conduit having an opening intermediate of its ends, a rotatable fowl carrier mounted in said opening and provided with means to receive a plurality of fowls, said carrier being operable to close the opening of the conduit and dispose one of the fowls thereon within said conduit to subject the same to a blast of air passing through the conduit whereby the feathers are removed from the fowl.

4. In an apparatus of the character described, an air conduit provided with an opening intermediate of its ends, a rotatable carrier mounted in said opening and consisting of a plurality of radially disposed wings, means for suspending a fowl between adjacent wings of the carrier, said carrier being operable to dispose one of the fowls within the conduit, the contiguous wings of the carrier closing the opening in the conduit, and means for locking the carrier against rotation.

5. In an apparatus of the character described, an air conduit having a blast fan at one end, a rotatable carrier mounted in the opening intermediate of its ends and provided with means to receive a plurality of fowls, said carrier being operable to dispose one of the fowls thereon within the conduit whereby the same is subjected to a blast of air passing therethrough and also close the opening in the conduit, and means for locking the carrier against rotation.

6. In an apparatus of the character described, an air conduit provided with a blast fan at one end, said conduit being of rectangular form and having its contiguous walls cut away intermediate of its ends to provide an opening in the conduit, a rotatable carrier mounted in said opening consisting of radially extending wings, a transparent pane in each of said wings, means for suspending a fowl between adjacent wings of the carrier, said carrier being operable to dispose one of the fowls thereon within the conduit and position the adjacent wings to close the opening in the conduit, and means for locking said carrier against rotation.

In testimony whereof I hereunto affix my signature in the presence of two witnesses.

WILLIAM SHORT.

Witnesses:
 PAUL B. RICHARDSON,
 VIVIENNE R. RICHARDSON.